United States Patent

Bahn

[11] Patent Number: 5,144,215
[45] Date of Patent: Sep. 1, 1992

[54] CURRENT SUPPLY CONTROL APPARATUS FOR AN INDUCTANCE LOAD

[75] Inventor: Itsuki Bahn, Nerima, Japan

[73] Assignee: Kabushikigaisha Sekogiken, Tokyo, Japan

[21] Appl. No.: 678,319

[22] PCT Filed: Sep. 4, 1990

[86] PCT No.: PCT/JP90/01127
§ 371 Date: Apr. 30, 1991
§ 102(e) Date: Apr. 30, 1991

[87] PCT Pub. No.: WO91/03870
PCT Pub. Date: Mar. 21, 1991

[30] Foreign Application Priority Data

Sep. 11, 1989 [JP] Japan ................. 1-233046

[51] Int. Cl.$^5$ ................................. H02P 5/40
[52] U.S. Cl. ........................ 318/701; 363/124
[58] Field of Search .......... 318/701, 810, 811; 388/811, 819; 363/41, 124

[56] References Cited

U.S. PATENT DOCUMENTS 4,933,621  6/1990  MacMinn et al. .......... 318/701
5,043,643  8/1991  Hedlund et al. .......... 318/701

FOREIGN PATENT DOCUMENTS 63-294297  11/1988  Japan .

Primary Examiner—David Smith, Jr.
Attorney, Agent, or Firm—Staas & Halsey

[57] ABSTRACT

The present invention provides a current supply control apparatus for an inductance load which controls the energizing current of an armature coil for a specified waveform when an electric motor is rotating at high speed. Since a great inductance load requires much time for the accumulation and discharge of magnetic energy, a chopper circuit is utilized for high-response current supply control. The current supply control of the inductance load can be achieved with higher responsiveness, despite the use of a lower applied voltage, by means of a diode (6, 6a) for back flow prevention, a small-capacity capacitor (5), etc.

1 Claim, 2 Drawing Sheets

CURRENT SUPPLY CONTROL APPARATUS FOR AN INDUCTANCE LOAD

TECHNICAL FIELD

The present invention relates to a current supply control apparatus for an inductance load, which is used to control the energizing current of an armature coil of an electric motor with an output of about 30 W or more for a specified waveform when the motor is rotating at high speed.

BACKGROUND ART

In current control for an electromagnet of a magnetic bearing, it is difficult to drastically to change energizing current for floating a rotor, since the inductance of the exciting coil of the bearing is high.

In order to ensure good responsiveness of a chopper circuit for the energizing current of an inductance load, the supply voltage is increased correspondingly if the inductance load is great, so that the rise of the energizing current is quickened, and accumulated magnetic energy attributable to the inductance is returned to the power supply. By doing this, the fall of the energizing current is quickened to improve responsiveness, whereby the energizing current is controlled.

There are means for increasing the supply voltage which are used to ensure high-speed response of the energizing current of a great inductance load by means of a chopper circuit. For higher responsiveness, however, the supply voltage is inevitably increased to an unpractically high level.

In the case of an induction motor of 500-W output or a reluctance-type electric motor, for example, a voltage five to ten times as high as the necessary applied voltage for the driving torque is needed to obtain a pulse width of several microseconds or thereabout for the chopper control of the armature current supply, which is not practical.

SUMMARY OF THE INVENTION

It is an object of the present invention to provide a current supply control apparatus for an inductance load, capable of effecting current supply control of the inductance load with satisfactory responsiveness despite the use of a low applied voltage.

The present invention provides a current supply control circuit for an inductance load, which comprises: first and second semiconductor switching elements connected across an inductance load; a dc power source for supplying power to the inductance load through the first and second semiconductor switching elements; a first diode reversely connected to a series junction of the first semiconductor switching element and the inductance load; a second diode reversely connected to a series junction of the second semiconductor switching element and the inductance load; a current sensing circuit for detecting an energizing current for the inductance load, thereby obtaining a detected voltage; a reference voltage including a set voltage with an optional waveform; a third diode for back flow prevention forwardly inserted on the side of the dc power source for supplying power to the inductance load; a small-capacitance capacitor connected in parallel with a series junction of the first and second semiconductor switching elements, the inductance load, and the current sensing circuit; and a chopper circuit adapted to render the first and second semiconductor switching elements nonconducting so that accumulated magnetic energy in the inductance load is prevented from flowing into the plus terminal of the dc power source by means of the third diode for back flow prevention when the reference voltage is exceeded by the detected voltage from the current sensing circuit, to convert the accumulated magnetic energy into electrostatic energy of the small-capacity capacitor by means of the first and second diodes, thereby causing the energizing current to fall rapidly, and to cause the first and second semiconductor switching elements to conduct when the energizing current is lowered to a predetermined value. Thus, the rise of the energizing current is quickened by means of a high voltage of the small-capacitance capacitor.

According to the present invention, when an exciting current of an inductance load 1 (voltage drop in a resistor 9) in FIG. 1(a) exceeds a reference voltage (voltage at a terminal 12), the output of an operational amplifier 11 goes low, and is dissipated through an amplifier circuit 7, so that translators 3a and 3b are rendered nonconducting.

Although accumulated magnetic energy in the load 1 is urged to return to a plus power supply terminal 2a by diodes 4a and 4b, it is prevented from doing so by a diode 6, and charges a capacitor 5.

Since the capacitance of the capacitor 5 is small, the voltage increases, and the exciting current falls rapidly. When the exciting current is lowered to a predetermined value, the output of the operational amplifier 11 returns to the high level due to its hysteretic property.

Thus, the transistors 3a and 3b conduct, so that the exciting current rapidly increases due to a high voltage of the capacitor 5, and then further increases due to the supply voltage.

A chopper circuit is formed such that the transistors 3a and 3b become nonconducting again when the exciting current exceeds the reference voltage.

The smaller the capacitance of the capacitor 5, the higher the chopper frequency can be. Therefore, the supply voltage can be a voltage corresponding to the energizing current value of the inductance load 1, so that there is no need of such a high voltage as the conventional means require.

Thus, the present invention has the following effect.

Since a great inductance load requires much time for the accumulation and discharge of magnetic energy, some conventional means utilize a chopper circuit which increases the applied voltage to effect high-response current supply control. Practically, however, the responsiveness has its limit.

According to the present invention, there is an effect that the current supply control of the inductance load can be achieved with higher responsiveness despite the use of a lower applied voltage.

DESCRIPTION OF THE PREFERRED EMBODIMENT

An embodiment of the present invention will now be described with reference to the drawings.

Figure 1:
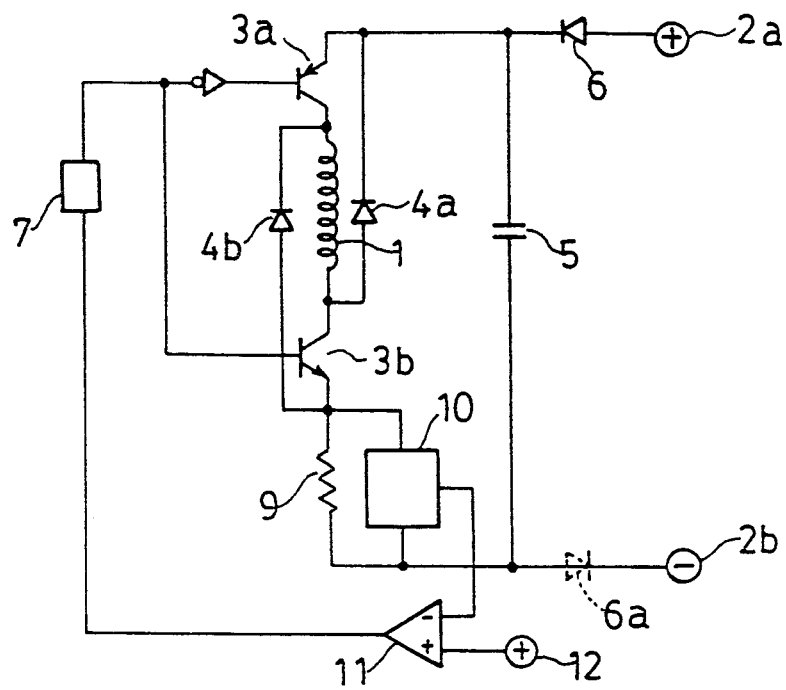
FIGS. 1(a) and 1(b) are electric circuit diagrams showing an embodiment of an apparatus according to the present invention.
Figure 1:
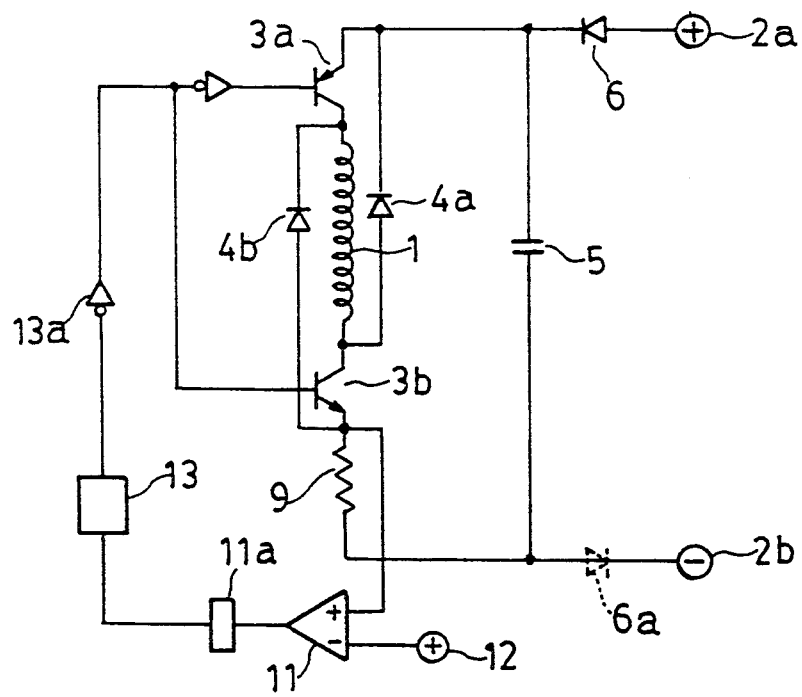

FIGS. 1(a) and 1(b) are electric circuit diagrams showing one embodiment of the present invention.

An inductance load 1 is one armature coil of an electric motor or an exciting coil of a magnetic bearing, for example. The magnetic core of the coil is not illustrated.

Transistors 3a and 3b are connected across the load 1, and diodes 4a and 4b are reversely connected to the individual transistors 3a and 3b and the load 1.

An exciting current (or an armature current) is detected as a voltage drop in a resistor 9, and is rectified by means of an absolute value circuit (rectifier circuit) 10, whose output is connected to a minus terminal of an operational amplifier 11. An input at a plus terminal serves as a reference voltage of a terminal 12.

Figure 2:
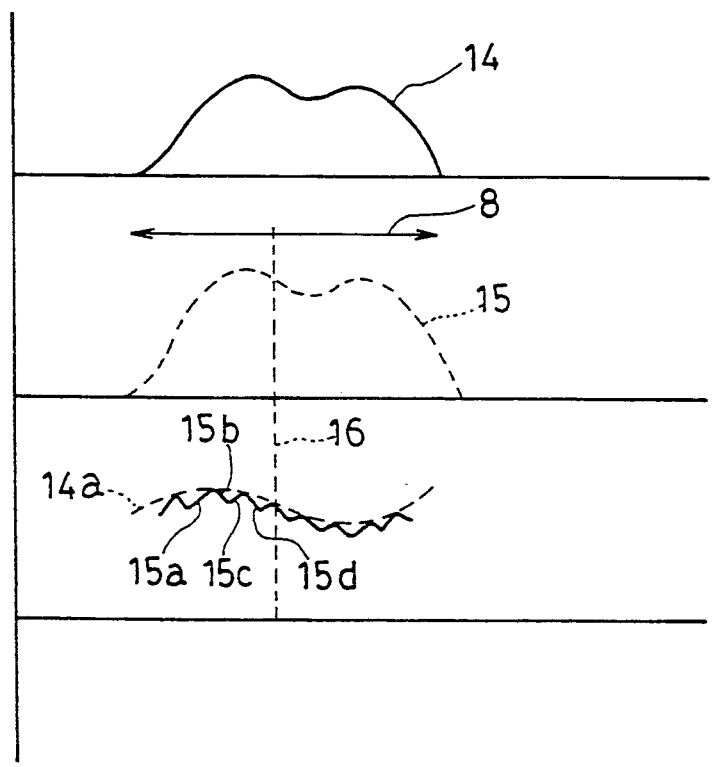
FIG. 2 is a time chart showing electrical signals for various parts of the circuits of FIGS. 1(a) and 1(b).

An example of the reference voltage is represented by a curve 14 in the time chart of FIG. 2.

The load 1 is supplied with power from dc power terminals 2a and 2b through a forwardly connected diode 6.

When the reference voltage represented by the curve 14 is applied to the input of the operational amplifier 11, the output of the operational amplifier 11 goes high, and is amplified by means of an amplifier circuit 7, and the transistor 3a is caused to conduct by means of an inverter circuit. At the same time, the transistor 3b is caused to conduct.

Accordingly, the load 1 is energized, and the exciting current rises, as indicated by a broken-line curve 15 in FIG. 2, so that current supply starts.

If the voltage drop (proportional to the exciting current) in the resistor 9 exceeds the voltage at the plus terminal of the operational amplifier 11, the output of the operational amplifier 11 goes low, so that transistors 3a and 3b become nonconducting.

According to the conventional means, great magnetic energy accumulated in the load 1 is returned to the side of the plus power supply terminal 2a to be dissipated. According to an apparatus of the present invention, however, the aforesaid return current is prevented by means of the diode 6 for back flow prevention, so that a capacitor 5 is charged a high voltage.

Thus, the current drops rapidly. When the current falls by a predetermined value, the output of the operational amplifier 11 returns to the high level due to its hysteretic property.

Accordingly, the transistors 3a and 3b conduct, and the exciting current is caused to rise rapidly by the charging voltage of the capacitor 5. When the output of the absolute value circuit 10 increases to the voltage of the curve 14, the transistors 3a and 3b become nonconducting again. Thus, a chopper circuit is formed which repeats this cycle, and the curve 15 indicative of the exciting current of the load 1 is proportional to the curve 14 (reference voltage).

A current curve at the bottom illustrates the aforesaid chopper effect only with respect to the region near a broken line 16, in a temporally enlarged manner.

A broken line 14a enlargedly represents an exciting current proportional to the reference voltage 14. Curves 15a, 15b, . . . represent actual pulsating flows in the load 1.

When the transistors 3a and 3b conduct, the current rises, as indicated by the curve 15a. In doing this, the current rapidly rises due to a high voltage attributable to electrostatic energy accumulated in the capacitor 5.

When the current rises to the level of the broken line 14a, the transistors 3a and 3b become nonconducting, so that the current falls, as indicated by the curve 15b. At this time, the magnetic energy accummulated in the load 1 charges the capacitor 5 to a high voltage, so that the fall is rapid.

As this cycle is repeated, the exciting current varies with its upper limit value on the curve 14a. The time duration of each of the curves 15a, 15b, . . . varies depending on the capacitance of the capacitor 5. More specifically, the smaller the capacitance, the shorter the time duration will be.

These circumstances can be inferred from the fact that the resonance frequency increases in proportion to the decrease of the capacitance of the capacitor 5, since the load 1 and the capacitor 5 resemble a parallel resonance circuit in character.

Only the current corresponding to a Joule loss caused by the resistance of the load 1 is supplied from a dc power source at the last stage of the leading edge of the current.

According to conventional means, the rise of the current is hastened by increasing the dc supply voltage to quicken the accumulation of the magnetic energy. The fall of the current is hastened by returning the accummulated magnetic energy to the power source.

Thus, the applied voltage becomes high, and the chopper frequency (time duration of the curves 15a, 15b, . . . ) cannot be lowered without limit.

When the length of an arrow 8 of a reference voltage curve 14 becomes as short as about 100 $\mu$sec. therefore, a response to the illustrated irregularity of the curve 14 cannot be obtained with a small time constant.

According to the apparatus of the present invention, a high-speed response can be obtained by reducing the capacitance of the capacitor 5 although the applied voltage is lowered.

An actual measurement revealed that the length of each of the curves 15a, 15b, . . . is 0.5 $\mu$sec with use of the applied dc voltage of 100 V when the exciting coil of the magnetic pole of a reluctance-type electric motor with an output of about 300 W is subjected to current supply control. In this case, the capacitance of the capacitor 5 is 0.1 $\mu$f.

Thus, the exciting current can enjoy high-response current supply control even using a great inductance load, so that a rotating body can be magnetically floated with higher accuracy by effecting the current supply control of the exciting coil of the magnetic bearing.

The aforementioned responsiveness can be further improved by using high-speed switching elements, such as IGBTs, in place of the transistors 3a and 3b.

If the curve 14 of FIG. 2 is a sine curve, the means of the present invention can be utilized for an inverter, so that a high-speed induction machine can be obtained which can operate at high speed with less vibration.

Although the diode 6 is inserted on the side of the plus power supply terminal 2a in FIG. 1(a), the present invention may also be effected if the diode is forwardly inserted in the position indicated by a broken line 6a on the side of the minus power supply terminal 2b.

In the embodiment of FIG. 1(b), the chopper circuit is modified. In FIG. 1(b), if the exciting current increases so that the voltage drop in the resistor 9 exceeds the voltage (curve 14 of FIG. 2) of the reference voltage terminal 12, the output of the operational amplifier 11 goes high.

A differential pulse at the leading edge of this output is obtained by means of a differential circuit 11a. Since the differential pulse energizes a monostable circuit 13, an electrical pulse with a predetermined time duration can be obtained.

This electrical pulse is inverted in an inverter circuit 13a, and energizes the transistors 3a and 3b to make them nonconducting.

The aforesaid time duration of the electrical pulse is made equal to the length of each of the curves 15b, 15d, ... of FIG. 2.

This time duration of the electrical pulse is determined corresponding to the capacitance of the capacitor 5. A chopper circuit with required responsiveness can be constructed, thus forming another means for effecting the present invention.

The present invention is used to control the energizing current of an armature coil of an electric motor with an output of about 30 W or more for a specified waveform when the motor is rotating at high speed.

I claim:

1. A current supply control circuit for an inductance load, comprising:

first and second semiconductor switching elements connected across an inductance load;

a dc power source for supplying power to said inductance load through said first and second semiconductor switching elements;

a first diode reversely connected to a series junction of said first semiconductor switching element and said inductance load;

a second reversely connected to a series junction of said second semiconductor switching element and said inductance load;

a current sensing circuit for detecting an energizing current for said inductance load, thereby obtaining a detected voltage;

a reference voltage including a set voltage with an optional waveform;

a third diode for back flow prevention forwardly inserted on a side of said dc power source for supplying power to said inductance load;

a small-capacity capacitor connected in parallel with a series junction of said first and second semiconductor switching elements, said inductance load, and said current sensing circuit; and a chopper circuit adapted to render said first and second semiconductor switching elements nonconducting so that accumulated magnetic energy in said inductance load is prevented from flowing into the plus terminal of said dc power source by means of said third diode for back flow prevention when said reference voltage is exceeded by the detected voltage from said current sensing circuit, to convert said accumulated magnetic energy into electrostatic energy of said small-capacity capacitor by means of said first and second diodes and to apply said electrostatic energy accumulated in said small-capacity capacitor to said inductance load when applying power to said inductance load, thereby causing said energizing current to fall rapidly, and to cause said first and second semiconductor switching elements to conduct when said energizing current is lowered to a predetermined value, whereby the rise of said energizing current is quickened by means of a high voltage of said small-capacity capacitor.

* * * * *